Patented Aug. 15, 1939

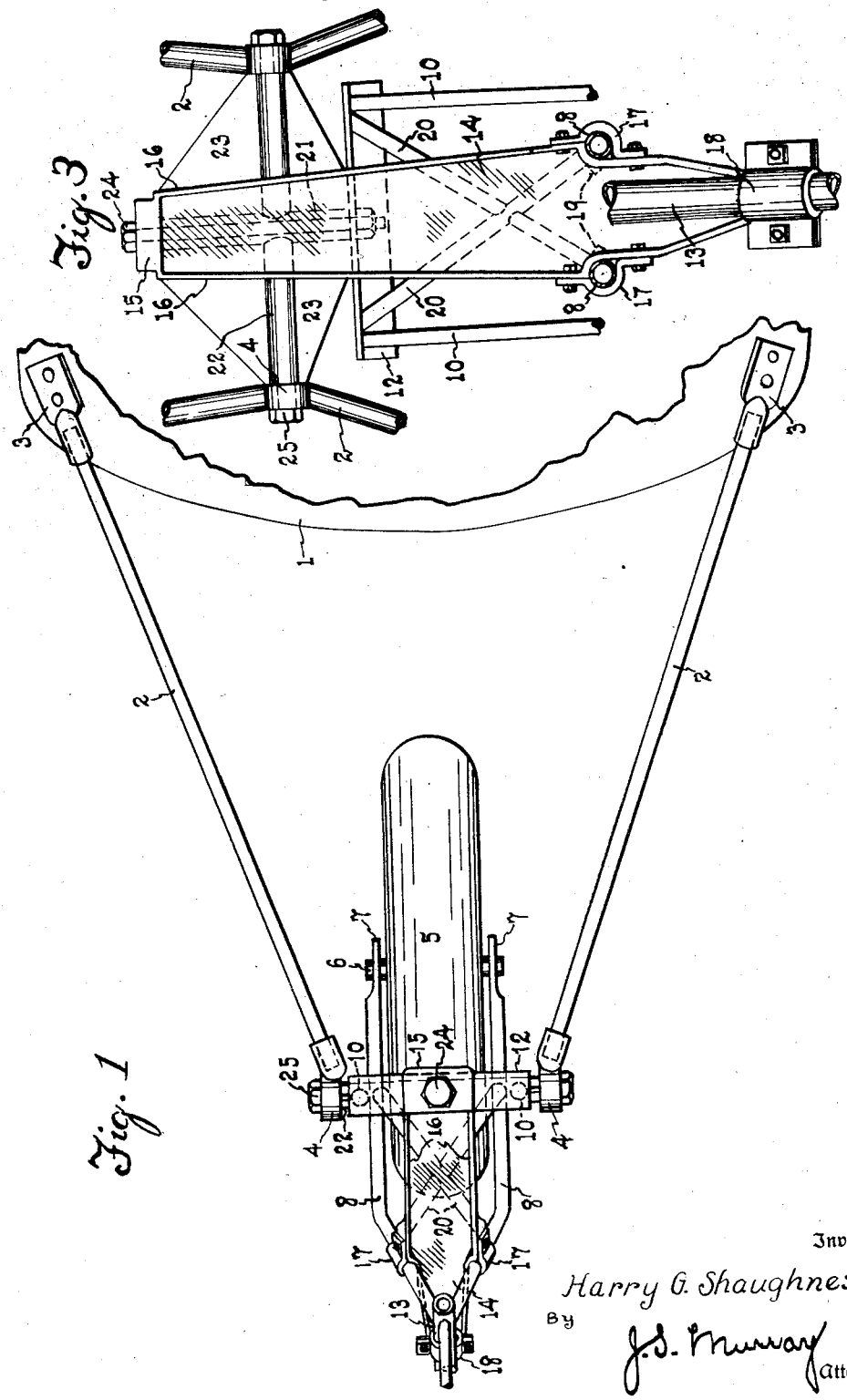

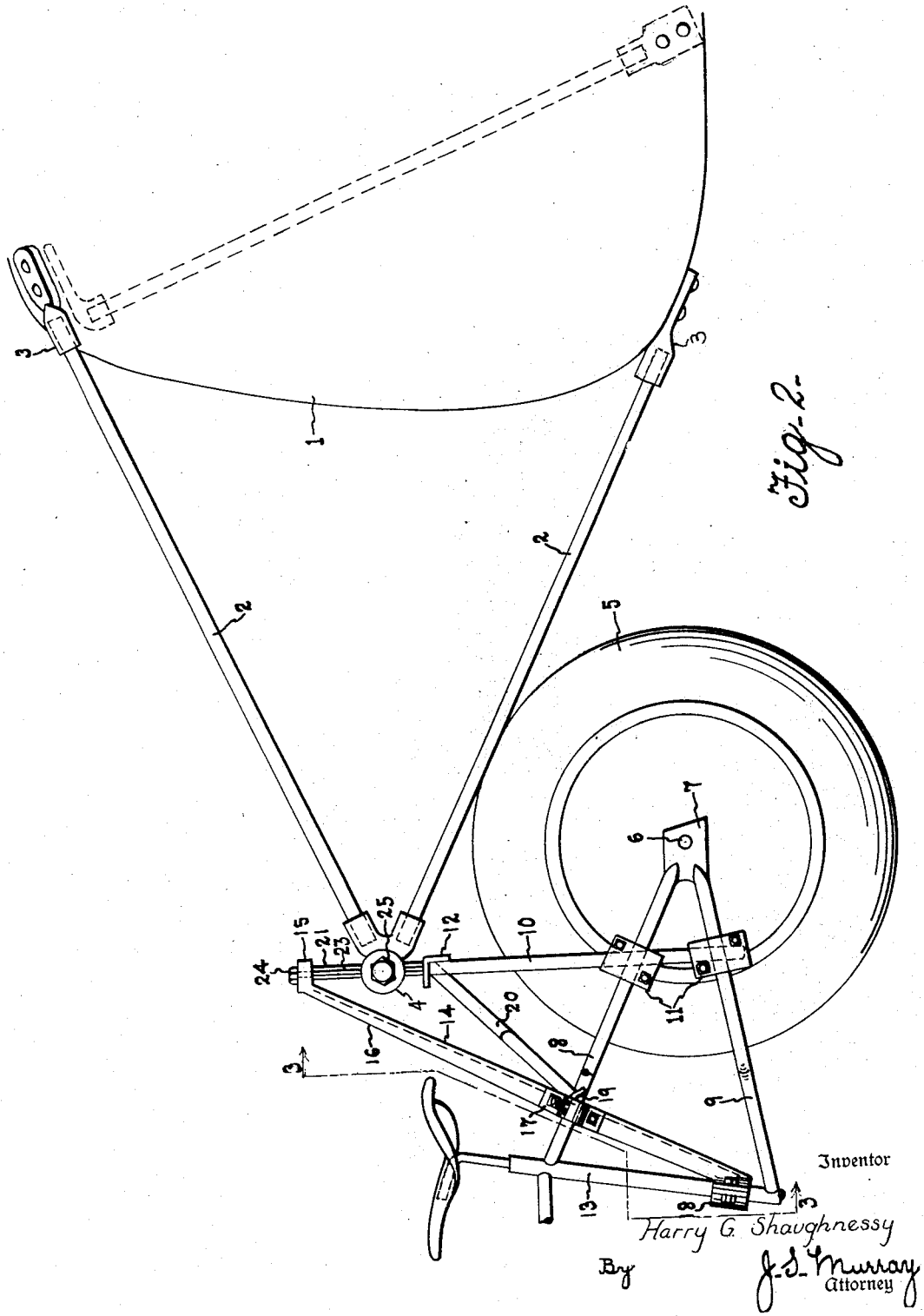

2,169,299

UNITED STATES PATENT OFFICE 2,169,299

TRAILER DRAFT CONNECTION

Harry G. Shaughnessy, Highland Park, Mich., assignor to Peninsular Metal Products Corporation, a corporation of Michigan Application November 8, 1937, Serial No. 173,341

2 Claims. (Cl. 280—292)

This invention relates to draft connections, particularly between a motor cycle or bicycle and a trailer.

The practice, heretofore, in equipping a motor cycle with an auxiliary wheeled carrier, has been to give such carrier the nature of a side car, because of difficulties involved in attaching a trailer. Side cars, however, impose laterally unbalanced stresses on a motor cycle, for which the latter is not generally designed, and because of such stresses, the feasible loads must be considerably less than could be carried by a trailer. While superiority of a trailer, from the stand-point of load capacity and balance, has been recognized, difficulties involved in the necessary draft connection have been an obstacle to practical developments along this line.

An object of the invention is to provide an attachment to the frame of a motor cycle, bicycle, or like towing vehicle, serving to mount above the rear wheel of such vehicle a draw-head adapted for rotation about a substantially vertical axis, and further adapted for engagement by a suitable draw-bar structure secured to a trailer.

Another object is to afford the draw-bar structure a movement about a substantially horizontal axis, established by the draw head, so that the towing vehicle and trailer may individually accommodate themselves to projections or depressions of a road surface.

A further object is to provide a trailer draw-bar structure of a strong truss form, and one that will transmit draft to the body of a trailer at several widely separated points, so as to materially reduce localized draft stresses as compared to prior practice.

These and various other objects are attained by the construction hereinafter described and illustrated in the accompanying drawings, wherein:

Fig. 1 is a top plan view of the improved draft connection, showing its engagement with a motor cycle and trailer.

Fig. 2 is a side elevational view of the same.

Fig. 3 is an enlarged front view of the draw-head and structure for mounting same on a motor cycle, the view being in part a section on the line 3—3 of Fig. 2.

In these views, the reference character 1 designates a trailer body of an enclosed type, its front end being rounded as shown, to secure an approximate stream-line effect. Secured to the forward portion of such body, is a pair of V-shaped draw-bar frames 2, respectively attached to the body in proximity to its respective sides, the ends of each frame being secured to the top and bottom portions of the body. Socket-forming fittings 3 are preferably secured to the body for engagement by the frames 2. The latter are preferably formed of tubular stock and extend convergently forwardly, their apices carrying a pair of laterally spaced collars 4 which, as shown, are comprised by yokes interconnecting the frame-forming tubes.

The described draw bar structure is primarily designed for attachment to an ordinary motor cycle, having its rear wheel 5 journaled on an axle 6 mounted in a pair of heads 7, each carried by and joining the rear ends of upper and lower forwardly diverging frame bars 8 and 9. The attaching means comprises a pair of upright bars 10, at opposite sides of and projecting above said wheel, their lower portions engaging and being rigidly clamped to the bars 8 and 9, as indicated at 11, and their upper ends being bridged across and rigidly interconnected by an angle bar 12, forming a lower draw-head support.

The bars 8 and 9 of the motor cycle frame are rigidly connected at their forward ends to a relatively large, substantially upright post 13, which, in conjunction with the bars 8, serves to mount a casting 14, upwardly extending from said post at a rearward inclination, and integrally carrying at its upper end an upper draw-head support 15, suitably spaced above the support 12. Said casting is in the nature of a plate, marginally reinforced by a flange 16, and having a maximum width in passing between the bars 8, its width being gradually reduced upwardly, and more abruptly reduced downwardly from said bars, as best appears in Fig. 3. Said casting has lateral shoulders, adapting it to seat on the bars 8, and is clamped to the latter by members 17, bolted to the casting above and below the bars. The lower end of the casting seats against the post 13, rearwardly of the latter, and a clamping member 18, engaging in front of the post, is bolted to the casting at each side of the post. As a further reinforcement for the attachment, it is preferred to form the casting 14, in proximity to the bars 8, with a pair of laterally spaced, forwardly projecting lugs 19, seating the lower ends of a pair of diagonally crossed brace members 20, preferably tubular, said members extending upwardly at a rearward inclination and engaging at their upper ends in the angle of the bar 12. Such brace members are welded together at their crossing and are terminally welded to the lugs 19 and bar 12, a high degree of rigidity resulting.

It is to be noted that attachment of the draw-head supports to the motor cycle frame, as above described, distributes draft stresses to various members of said frame and establishes, at the same time, a strong reinforcing connection between such members, materially increasing the draft load capacity of the frame.

To connect the draw bar structure to the described draft frame, there is employed a draw-head, comprising vertical and horizontal tubes 21 and 22, rigidly interconnected and reinforced by web members 23. This draw-head fits between the supports 12 and 15, and is pivoted thereon to turn about a vertical axis by a bolt 24 extended through the tube 21. The collars 3 are engageable at opposite ends of the tube 22, and a pair of bolts 25, pivotally engaging such collars, are tapped or otherwise fastened in said tube. It is evident that the joint thus established between the motor cycle and trailer, is equivalent in effect to a universal joint, allowing a relative play about either a horizontal or vertical axis, or both.

An important feature of the described draft connection is the location of the draw head well above the ground level, thus permitting the motor cycle to exercise a considerable leverage in overcoming any force tending to tilt the trailer laterally. Such a force arises under various conditions, as for example in swinging rapidly around a corner, and might easily throw both motor cycle and trailer on their sides, if the resistant effort of the motor cycle rider is not applied under adequate leverage.

Also of importance is the clearance afforded the draw-bar frames 2, with respect to the rear wheel of the motor cycle, when the structure comprising said frames swings about either the vertical or horizontal axes of the draw head. Normal divergency of the two V-shaped frames to the plane of rotation of the wheel assures adequate clearance, when said swinging is about the vertical axis, and since neither frame swings into said plane of rotation, the wheel may not interfere with said swinging about a horizontal axis.

The described draft connection has ample strength to transmit normal stresses, and avoids such concentration thereof, acting either on the motor cycle or trailer, as might effect distortion or other damage.

Preferably the trailer body 1 is equipped with a pair of coaxial wheels (not shown), one at each side thereof, so that, when attached to a motor cycle or bicycle the latter is held upright, whether parked or in motion, eliminating need for the auxiliary parking support, ordinarily required for such vehicles.

The invention is presented as including all such modifications and changes as come within the scope of the following claims.

What I claim is:

1. In a trailer draft connection, the combination with a towing vehicle, having a single rear wheel and a frame comprising a pair of upper bars extending forwardly substantially from the wheel axis, one at each side of the wheel, and a pair of lower bars extending forwardly from the wheel axis, one at each side of the wheel, of a pair of uprights mounted jointly on said upper and lower frame bars, one at each side of the wheel, a draw head, a lower support for the draw head, bridged across the upper ends of said uprights, an upper support for the draw head spaced above the lower support, a rearwardly inclined upright jointly mounted on the upper bars of the frame, and having the upper support carried by its upper end, a pair of bars forming a truss interconnecting said rearwardly inclined upright and the lower support for the draw head.

2. In a trailer draft connection, the combination with a towing vehicle, having a single rear wheel and a frame forwardly extending from such wheel and comprising a seat-mounting post, of a draw head disposed above said wheel, a pair of supports above and below the draw head, means journaling the draw head on such supports to turn about a substantially vertical axis, means for rigidly mounting the lower support on said frame, and an elongated member mounting the upper support extending downwardly therefrom convergently to said post and rigidly secured between its ends to the frame rearwardly of the post, and rigidly secured at its lower end to the post.

HARRY G. SHAUGHNESSY.